United States Patent
Seo et al.

(10) Patent No.: US 8,986,147 B2
(45) Date of Patent: Mar. 24, 2015

(54) CONTINUOUSLY VARIABLE TRANSMISSION FOR VEHICLE

(71) Applicant: Hyundai Motor Company, Seoul (KR)

(72) Inventors: Tae Seok Seo, Suwon-si (KR); Dong Hwan Hwang, Seoul (KR); Seongeun Yun, Siheung-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/096,983

(22) Filed: Dec. 4, 2013

(65) Prior Publication Data

US 2014/0357444 A1 Dec. 4, 2014

(30) Foreign Application Priority Data

May 28, 2013 (KR) ........................ 10-2013-0060525

(51) Int. Cl.
*F16H 37/02* (2006.01)

(52) U.S. Cl.
CPC .................................. *F16H 37/027* (2013.01)
USPC ....................................................... 475/200

(58) Field of Classification Search
USPC ......... 475/200, 206; 476/19, 21; 74/325, 329, 74/333
See application file for complete search history.

(56) References Cited

U.S. PATENT DOCUMENTS

| | | | | |
|---|---|---|---|---|
| 3,340,749 | A * | 9/1967 | Magg et al. ................... | 475/211 |
| 4,290,320 | A * | 9/1981 | Abbott ............................ | 475/66 |
| 4,433,594 | A * | 2/1984 | Smirl ............................. | 475/206 |
| 4,489,622 | A * | 12/1984 | Underwood ................... | 74/361 |
| 4,548,100 | A * | 10/1985 | Hohn ............................ | 475/200 |
| 4,817,458 | A * | 4/1989 | Akutagawa et al. ....... | 74/665 GE |
| 5,088,352 | A * | 2/1992 | Ishimaru ....................... | 477/46 |
| 7,278,939 | B2 * | 10/2007 | Sato et al. ..................... | 474/72 |
| 2013/0244819 | A1 * | 9/2013 | Eo et al. ....................... | 474/39 |

FOREIGN PATENT DOCUMENTS

| | | |
|---|---|---|
| JP | 61-17759 A | 1/1986 |
| JP | 61-74958 A | 4/1986 |

* cited by examiner

*Primary Examiner* — Roger Pang
(74) *Attorney, Agent, or Firm* — Morgan, Lewis & Bockius LLP (57) ABSTRACT

A continuously variable transmission apparatus for a vehicle, may include a main shaft configured to receive torque of an engine, a subshaft disposed in parallel with and spaced apart from the main shaft, a reverse speed gear set having a reverse speed gear selectively connected to the main shaft, a first speed gear set having a first speed gear selectively connected to the subshaft, a second speed gear set having a second speed gear selectively connected to the subshaft, a variable shift apparatus engaged with the main shaft and the subshaft and continuously changing a ratio between rotation speeds of the main shaft and the subshaft so as to transmit torque of the main shaft to the subshaft, and an output gear set transmitting torque transmitted from the first speed gear or the second speed gear to a differential through a final reduction gear.

15 Claims, 5 Drawing Sheets

|  | CL1 | CL2 | CL3 |
|---|---|---|---|
| REV | ○ |  |  |
| N |  |  |  |
| 1st |  | ○ |  |
| 2nd |  |  | ○ |

CONTINUOUSLY VARIABLE TRANSMISSION FOR VEHICLE

CROSS-REFERENCE TO RELATED APPLICATION

The present application claims priority to Korean Patent Application No. 10-2013-0060525 filed on May 28, 2013, the entire contents of which is incorporated herein for all purposes by this reference.

BACKGROUND OF THE INVENTION

1. Field of the Invention

The present invention relates to a continuously variable transmission for a vehicle. More particularly, the present invention relates to a continuously variable transmission for a vehicle which improves fuel economy and power performance as a consequence of realizing two forward speeds and one reverse speed basically by using a plurality of externally-meshed gear sets and a variable shift apparatus, changing speed ratios continuously within basic shift-speeds, and enlarging a range of speed ratios.

2. Description of Related Art

Generally, a continuously variable transmission is configured to receive torque output from an engine through power delivery means of fluid type such as a torque converter or a fluid coupling, to change the torque according to a speed ratio which changes continuously and is achieved by a variable shift apparatus, and to transmit the changed torque to an output shaft.

The variable shift apparatus includes first and second variable pulleys disposed respectively on a driving shaft and a driven shaft, and a metal belt connecting the first and second variable pulleys. The variable shift apparatus is adapted to change the speed ratios continuously by controlling widths of the first and second variable pulleys connected through the metal belt by hydraulic pressure.

If a target shift-speed according to a driving condition such as a vehicle speed, an engine rotation speed, and a load is calculated by using a predetermined shift pattern, an opening of a shift-speed control valve connected to the first and second variable pulleys is controlled so as to achieve the target shift-speed.

Recently, a continuously variable transmission using an auxiliary shift apparatus has been vividly researched. The continuously variable transmission using the auxiliary shift apparatus includes shift-speed control means provided with at least one planetary gear set, the variable shift apparatus, and at least one externally-meshed gear set. The continuously variable transmission using the auxiliary shift apparatus realizes two forward speeds and one reverse speed basically and changes speed ratios continuously within basic shift-speeds.

However, since the continuously variable transmission using the auxiliary shift apparatus includes at least one planetary gear set, structure thereof may be complex and mountability may be deteriorated due to increase of volume and weight. In addition, fuel economy may be deteriorated due to increase of the weight.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a continuously variable transmission for a vehicle having advantages of improving fuel economy and power performance as a consequence of realizing two forward speeds and one reverse speed basically by using a plurality of externally-meshed gear sets and a variable shift apparatus, changing speed ratios continuously within basic shift-speeds, and enlarging a range of speed ratios.

In an aspect of the present invention, a continuously variable transmission apparatus for a vehicle, may include a main shaft configured to receive torque of an engine, a subshaft disposed in parallel with and spaced apart from the main shaft, a reverse speed gear set having a reverse speed gear selectively connected to the main shaft, a first speed gear set having a first speed gear selectively connected to the subshaft, a second speed gear set having a second speed gear selectively connected to the subshaft, a variable shift apparatus engaged with the main shaft and the subshaft and continuously changing a ratio between rotation speeds of the main shaft and the subshaft so as to transmit torque of the main shaft to the subshaft, and an output gear set transmitting torque transmitted from the first speed gear or the second speed gear to a differential through a final reduction gear.

The reverse speed gear set may include the reverse speed gear disposed on the main shaft without rotational interference in-between, and a first clutch selectively connecting the main shaft with the reverse speed gear.

The first speed gear set may include the first speed gear disposed on the subshaft without rotational interference in-between, and a second clutch selectively connecting the subshaft with the first speed gear.

The second speed gear set may include the second speed gear disposed on the subshaft without rotational interference in-between and externally meshed to the reverse speed gear, and a third clutch selectively connecting the subshaft with the second speed gear.

The first speed gear set may include the first speed gear disposed on the subshaft without rotational interference in-between and externally meshed with the reverse speed gear, and a second clutch selectively connecting the subshaft with the first speed gear.

The second speed gear set may include the second speed gear disposed on the subshaft without rotational interference in-between, and a third clutch selectively connecting the subshaft with the second speed gear.

The variable shift apparatus may include a primary pulley connected to the main shaft and changing a diameter thereof, a secondary pulley connected to the subshaft and changing a diameter thereof, and a belt connecting the primary pulley with the secondary pulley.

The output gear set may include an output shaft disposed in parallel with and spaced apart from the subshaft, a first output gear disposed on the output shaft and externally meshed with the first speed gear, and a second output gear disposed on the output shaft, externally meshed with the second speed gear, and externally meshed with the final reduction gear of the differential.

The output gear set may include an output shaft disposed in parallel with and apart from the subshaft, a first output gear disposed on the output shaft, externally meshed with the first speed gear, and externally meshed with the final reduction gear of the differential, and a second output gear disposed on the output shaft and externally meshed with the second speed gear.

In another aspect of the present invention, a continuously variable transmission apparatus for a vehicle, may include a main shaft configured to receive torque of an engine, a subshaft disposed in parallel with and spaced apart from the main shaft, an output shaft disposed in parallel with and spaced apart from the subshaft, a reverse speed gear disposed on the main shaft without rotational interference in-between and selectively connected to the main shaft through a first clutch, a first speed gear disposed on the subshaft without rotational interference in-between and selectively connected to the subshaft through a second clutch, a second speed gear disposed on the subshaft without rotational interference in-between and selectively connected to the subshaft through a third clutch, a first output gear disposed on the output shaft and externally meshed with the first speed gear, a second output gear disposed on the output shaft and externally meshed with the second speed gear, and a variable shift apparatus continuously changing a ratio between rotation speeds of the main shaft and the subshaft so as to transmit torque of the main shaft to the subshaft, wherein the reverse speed gear is configured to transmit the torque of the main shaft to the subshaft through the first speed gear or the second speed gear, and the first output gear or the second output gear is configured to transmit torque of the output shaft to a differential through a final reduction gear.

The variable shift apparatus may include a primary pulley connected to the main shaft and changing a diameter thereof, a secondary pulley connected to the subshaft and changing a diameter thereof, and a belt connecting the primary pulley with the secondary pulley.

The reverse speed gear is externally meshed with the second speed gear such that the torque of the main shaft is transmitted to the subshaft.

The reverse speed gear is externally meshed to the first speed gear such that the torque of the main shaft is transmitted to the subshaft.

The first output gear is externally meshed with the final reduction gear such that the torque of the output shaft is transmitted to the differential.

The second output gear is externally meshed with the final reduction gear such that the torque of the output shaft is transmitted to the differential.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention will hereinafter be described in detail with reference to the accompanying drawings.

Description of components which are not necessary for explaining the present invention will be omitted, and the same constituent elements are denoted by the same reference numerals in this specification.

In a detailed description, the components which have the same name are differentiated by ordinal numbers, but are not limited to the sequence.

Figure 1:
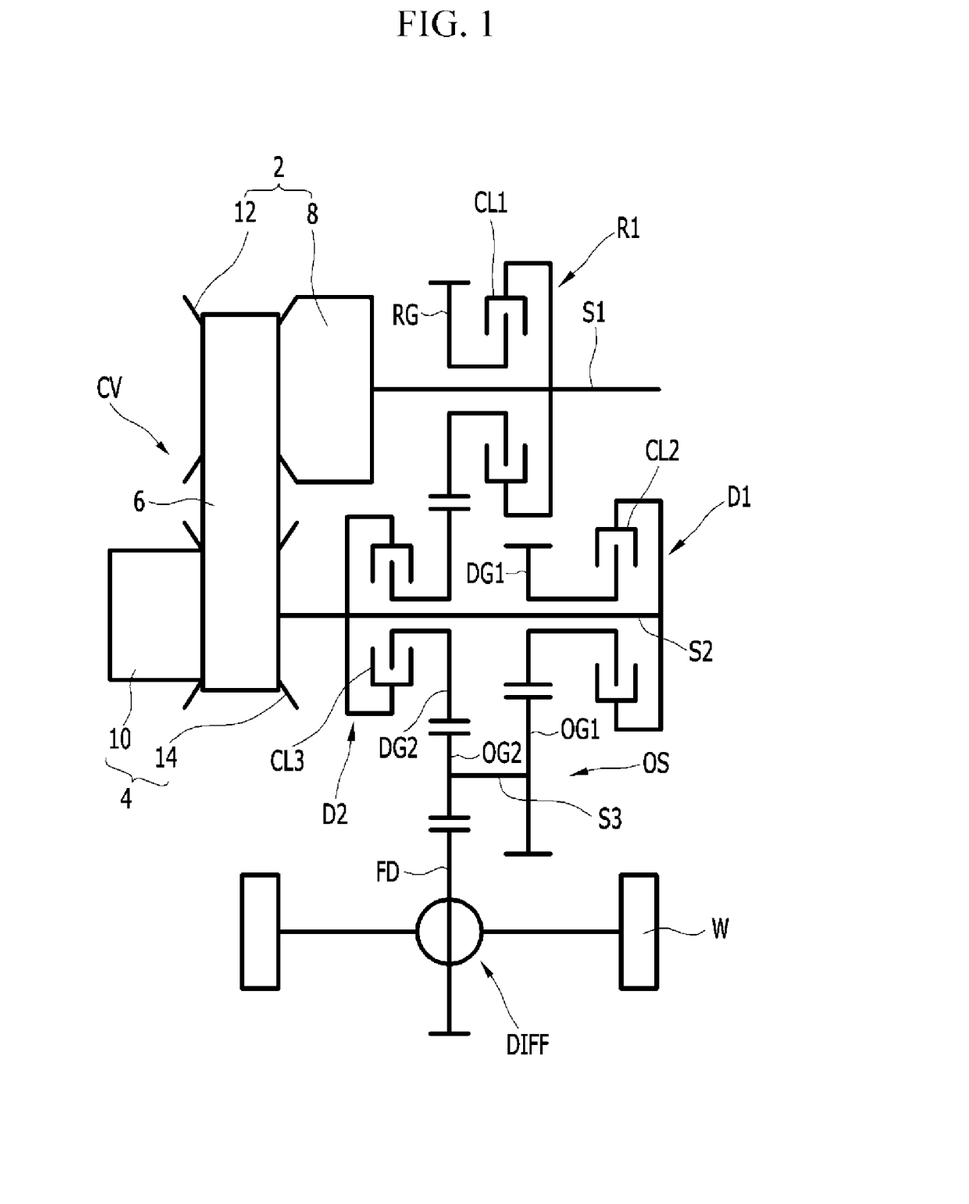
FIG. 1 is a schematic diagram of a continuously variable transmission according to the various exemplary embodiments of the present invention.

FIG. 1 is a schematic diagram of a continuously variable transmission according to the first exemplary embodiment of the present invention.

Referring to FIG. 1, a continuously variable transmission according to the first exemplary embodiment of the present invention includes a main shaft S1, a subshaft S2, a reverse speed gear set R1, a first speed gear set D1, a second speed gear set D2, a variable shift apparatus CV and an output gear set OS.

The main shaft S1 is an input member, and torque of an engine is converted through a torque converter and is input to the main shaft S1.

The subshaft S2 is an intermediate power transmitting member, and is disposed in parallel with and apart from the main shaft S1. Torque of the main shaft S1 is transmitted to the subshaft S2 through two paths.

The reverse speed gear set R1 includes a reverse speed gear RG disposed on the main shaft S1 without rotational interference in-between, and a first clutch CL1 selectively connecting the main shaft S1 with the reverse speed gear RG.

The first speed gear set D1 includes a first speed gear DG1 disposed on the subshaft S2 without rotational interference in-between, and a second clutch CL2 selectively connecting the subshaft S2 with the first speed gear DG1.

The second speed gear set D2 includes a second speed gear DG2 disposed on the subshaft S2 without rotational interference in-between and externally meshed with the reverse speed gear RG, and a third clutch CL3 connecting the subshaft S2 with the second speed gear DG2.

It is exemplified in this specification, but is not limited, that the second speed gear DG2 is externally meshed with the reverse speed gear RG. The first speed gear DG1 instead of the second speed gear DG2 may be externally meshed with the reverse speed gear RG as design condition demands.

The variable shift apparatus CV includes a primary pulley 2 connected to the main shaft S1, a secondary pulley 4 connected to the subshaft S2 and a belt 6 connecting the primary pulley 2 and the secondary pulley 4.

The primary pulley 2 and the secondary pulley 4, as well known to a person of an ordinary skill in the art, respectively include fixed sheaves 8 and 10 and movable sheaves 12 and 14. If the movable sheaves 12 and 14 move axially by hydraulic pressure, diameters of the pulleys 2 and 4 contacting side surfaces of the belt 6 change. Finally, a speed ratio is determined by a ratio between the diameters of the first pulley 2 and the second pulley 4.

The output gear set OS is an output member and includes an output shaft S3 disposed in parallel with and apart from the subshaft S2. The output gear set OS transmits torque of the subshaft S2 input through two paths to a driving wheel W through a differential DIFF.

That is, a first output gear OG1 externally meshed with the first speed gear DG1 is mounted at one end portion of the output shaft S3, and a second output gear OG2 externally meshed with the second speed gear DG2 is mounted at the other end portion of the output shaft S3.

The differential DIFF includes a final reduction gear FD externally meshed with the first output gear OG1 or the second output gear OG2. Torque input to the final reduction gear FD is transmitted to the driving wheel W through the differential DIFF.

Figure 2:
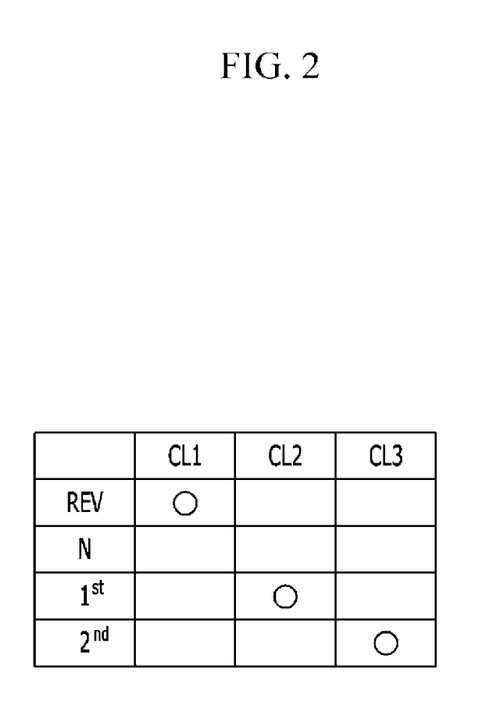
FIG. 2 is an operational chart of friction elements at each shift-speed in a continuously variable transmission according to the various exemplary embodiments of the present invention.

FIG. 2 is an operational chart of friction elements at each shift-speed in a continuously variable transmission according to the first exemplary embodiment of the present invention.

Referring to FIG. 2, the first clutch CL1 is operated at a reverse speed REV, the second clutch CL2 is operated at a first forward speed 1st, and the third clutch CL3 is operated at a second forward speed 2nd.

That is, the first clutch CL1 is operated at the reverse speed REV such that torque of the main shaft S1 is transmitted to the final reduction gear FD of the differential DIFF through the reverse speed gear RG, the second speed gear DG2 and the second output gear OG2. Therefore, shifting to the reverse speed is completed.

In addition, the second clutch CL2 is operated at the first forward speed 1st such that the torque of the main shaft S1 is transmitted to the reduction gear FD of the differential DIFF through the variable shift apparatus CV, the subshaft S2, the first speed gear DG1, the first output gear OG1, the output shaft S3 and the second output gear OG2. Therefore, shifting to the first forward speed is completed.

In addition, the third clutch CL3 is operated at the second forward speed 2nd such that the torque of the main shaft S1 is transmitted to the final reduction gear FD of the differential DIFF through the variable shift apparatus CV, the subshaft S2, the second speed gear DG2 and the second output gear OG2. Therefore, shifting to the second forward speed is completed.

As described above, the variable shift apparatus CV is operated at first the forward speed and the second forward speed.

That is, power delivery is achieved in a state that the diameter of the primary pulley 2 is comparatively small and the diameter of the secondary pulley 4 is comparatively large just after the shift to the first forward speed is completed by operating the second clutch CL2.

The diameter of the primary pulley 2 gradually increases and the diameter of the secondary pulley 4 gradually decreases at this state. Therefore, a vehicle speed gradually increases. If the vehicle speed increases further, the second clutch CL2 is released and the third clutch CL3 is operated such that the shifting to the second forward speed is completed.

In addition, after the shifting to the second forward speed is completed, the variable shift apparatus CV is controlled to increase the vehicle speed continuously again.

The continuously variable transmission according to an exemplary embodiment of the present invention realizes two forward speeds and one reverse speed basically by using three gear sets R1, D1, and D2 instead of a planetary gear set, and changes speed ratios continuously within basic shift-speeds.

Therefore, mountability may be improved by reducing volume and weight of the continuously variable transmission, and a range of speed ratios may be enlarged and fuel economy and power performance may be improved by adjusting gear ratios of the first speed gear DG1 and the second speed gear DG2.

Figure 3:
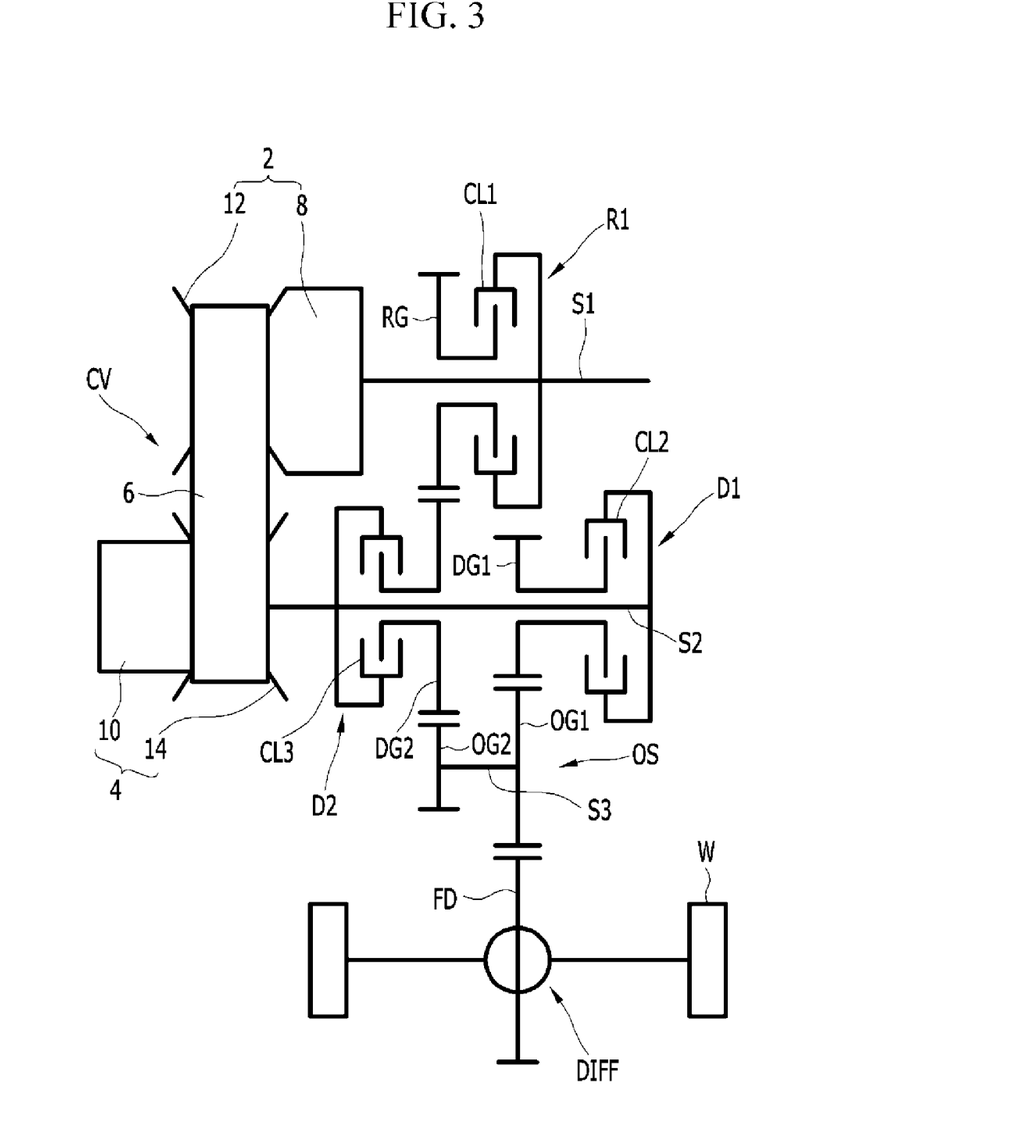
FIG. 3 is a schematic diagram of a continuously variable transmission according to the various exemplary embodiments of the present invention.

FIG. 3 is a schematic diagram of a continuously variable transmission according to the second exemplary embodiment of the present invention.

Referring to FIG. 3, the final reduction gear FD is externally meshed with the second output gear OG2 in the first exemplary embodiment, but the final reduction gear FD is externally meshed with the first output gear OG1 in the second exemplary embodiment.

Since shifting processes and functions of the second exemplary embodiment are the same as those of the first exemplary embodiment, detailed description thereof will be omitted.

Figure 4:
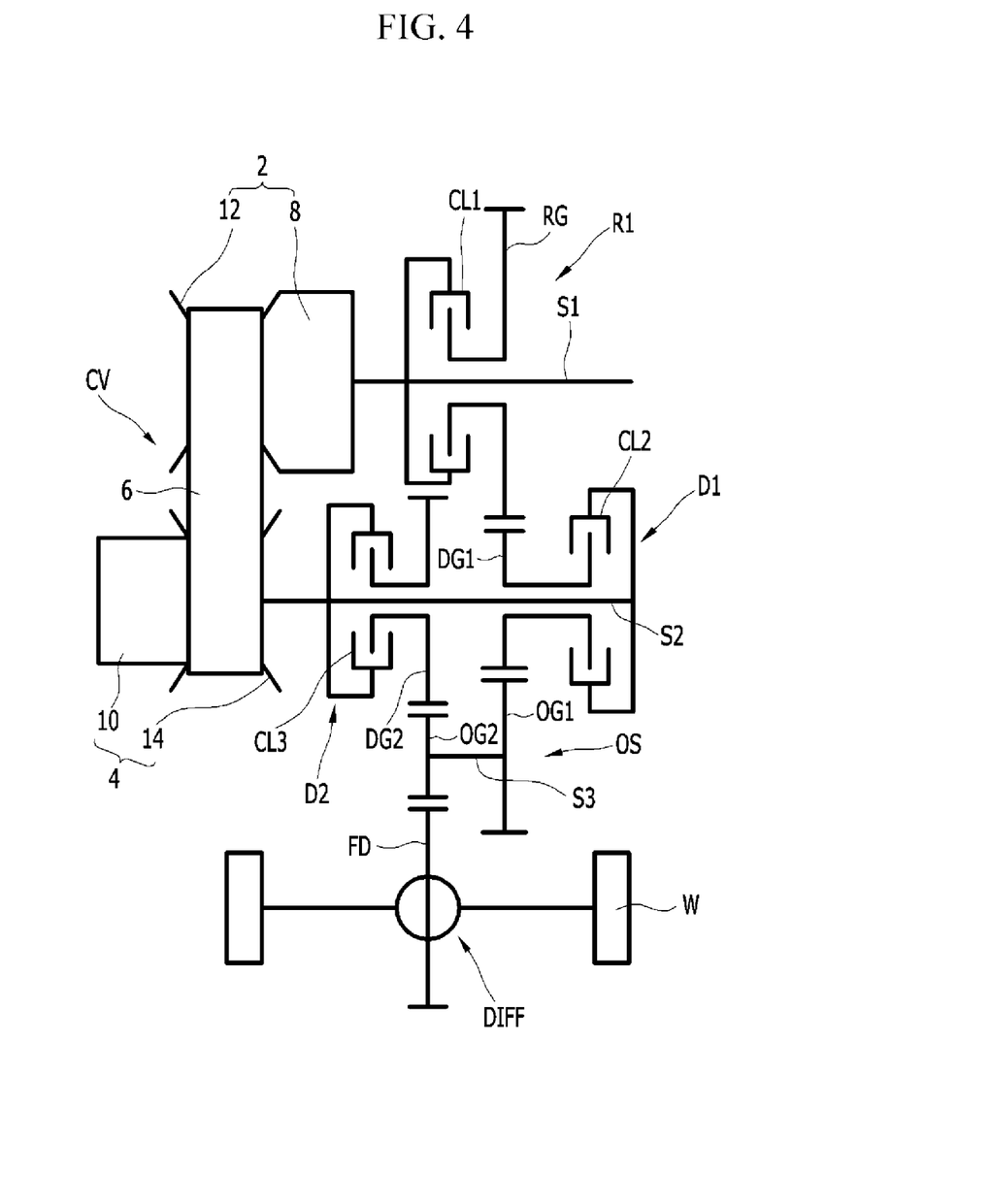
FIG. 4 is a schematic diagram of a continuously variable transmission according to the various exemplary embodiments of the present invention.

FIG. 4 is a schematic diagram of a continuously variable transmission according to the third exemplary embodiment of the present invention.

Referring to FIG. 4, although the reverse speed gear RG is externally meshed with the second speed gear DG2 in the first exemplary embodiment, the reverse speed gear RG is externally meshed with the first speed gear DG1 in the third exemplary embodiment.

Since shifting processes and functions of the third exemplary embodiment are the same as those of the first exemplary embodiment except a diameter of the reverse speed gear RG, detailed description thereof will be omitted.

Figure 5:
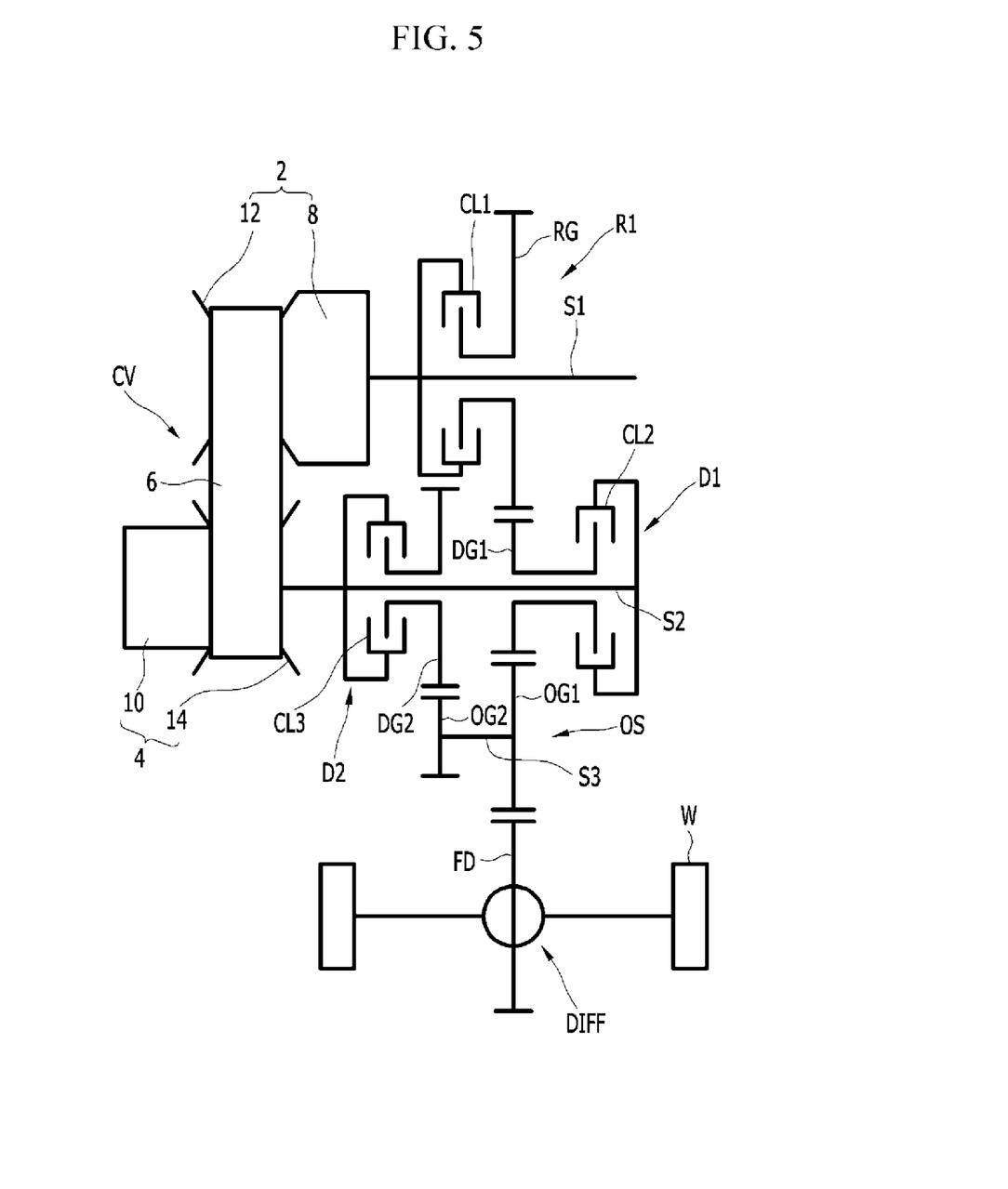
FIG. 5 is a schematic diagram of a continuously variable transmission according to the various exemplary embodiments of the present invention.

FIG. 5 is a schematic diagram of a continuously variable transmission according to the fourth exemplary embodiment of the present invention.

Referring to FIG. 5, although the reverse speed gear RG is externally meshed with the second speed gear DG2 and the final reduction gear FD is externally meshed with the second output gear OG2 in the first exemplary embodiment, the reverse speed gear RG is externally meshed with the first speed gear DG1 and the final reduction gear FD is externally meshed with the first output gear OG1 in the fourth exemplary embodiment.

Since shifting processes and functions of the fourth exemplary embodiment are the same as those of the first exemplary embodiment except the diameter of the reverse speed gear RG, detailed description thereof will be omitted.

The continuously variable transmission according to an exemplary embodiment of the present invention realizes two forward speeds and one reverse speed basically by using three gear sets instead of a planetary gear set, and changes speed ratios continuously within basic shift-speeds by using the variable shift apparatus.

Therefore, mountability may be improved by reducing volume and weight of the continuously variable transmission, and a range of speed ratios may be enlarged and fuel economy and power performance may be improved by adjusting gear ratios of the first speed gear and the second speed gear.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A continuously variable transmission apparatus for a vehicle, comprising:
   a main shaft configured to receive torque of an engine;
   a subshaft disposed in parallel with and spaced apart from the main shaft;
   a reverse speed gear set having a reverse speed gear selectively connected to the main shaft;
   a first speed gear set having a first speed gear selectively connected to the subshaft;
   a second speed gear set having a second speed gear selectively connected to the subshaft;
   a variable shift apparatus engaged with the main shaft and the subshaft and continuously changing a ratio between rotation speeds of the main shaft and the subshaft so as to transmit torque of the main shaft to the subshaft; and
   an output gear set transmitting torque transmitted from the first speed gear or the second speed gear to a differential through a final reduction gear.

2. The continuously variable transmission apparatus of claim 1, wherein the reverse speed gear set includes:
   the reverse speed gear disposed on the main shaft without rotational interference in-between; and
   a first clutch selectively connecting the main shaft with the reverse speed gear.

3. The continuously variable transmission apparatus of claim 1, wherein the first speed gear set includes:
   the first speed gear disposed on the subshaft without rotational interference in-between; and
   a second clutch selectively connecting the subshaft with the first speed gear.

4. The continuously variable transmission apparatus of claim 2, wherein the second speed gear set includes:
   the second speed gear disposed on the subshaft without rotational interference in-between and externally meshed to the reverse speed gear; and
   a third clutch selectively connecting the subshaft with the second speed gear.

5. The continuously variable transmission apparatus of claim 2, wherein the first speed gear set includes:
   the first speed gear disposed on the subshaft without rotational interference in-between and externally meshed with the reverse speed gear; and
   a second clutch selectively connecting the subshaft with the first speed gear.

6. The continuously variable transmission apparatus of claim 1, wherein the second speed gear set includes:
   the second speed gear disposed on the subshaft without rotational interference in-between; and
   a third clutch selectively connecting the subshaft with the second speed gear.

7. The continuously variable transmission apparatus of claim 1, wherein the variable shift apparatus includes:
   a primary pulley connected to the main shaft and changing a diameter thereof;
   a secondary pulley connected to the subshaft and changing a diameter thereof; and
   a belt connecting the primary pulley with the secondary pulley.

8. The continuously variable transmission apparatus of claim 1, wherein the output gear set includes:
   an output shaft disposed in parallel with and spaced apart from the subshaft;
   a first output gear disposed on the output shaft and externally meshed with the first speed gear; and
   a second output gear disposed on the output shaft, externally meshed with the second speed gear, and externally meshed with the final reduction gear of the differential.

9. The continuously variable transmission apparatus of claim 1, wherein the output gear set includes:
   an output shaft disposed in parallel with and apart from the subshaft;
   a first output gear disposed on the output shaft, externally meshed with the first speed gear, and externally meshed with the final reduction gear of the differential; and
   a second output gear disposed on the output shaft and externally meshed with the second speed gear.

10. A continuously variable transmission apparatus for a vehicle, comprising:
    a main shaft configured to receive torque of an engine;
    a subshaft disposed in parallel with and spaced apart from the main shaft;
    an output shaft disposed in parallel with and spaced apart from the subshaft;
    a reverse speed gear disposed on the main shaft without rotational interference in-between and selectively connected to the main shaft through a first clutch;
    a first speed gear disposed on the subshaft without rotational interference in-between and selectively connected to the subshaft through a second clutch;
    a second speed gear disposed on the subshaft without rotational interference in-between and selectively connected to the subshaft through a third clutch;
    a first output gear disposed on the output shaft and externally meshed with the first speed gear;
    a second output gear disposed on the output shaft and externally meshed with the second speed gear; and
    a variable shift apparatus continuously changing a ratio between rotation speeds of the main shaft and the subshaft so as to transmit torque of the main shaft to the subshaft,
    wherein the reverse speed gear is configured to transmit the torque of the main shaft to the subshaft through the first speed gear or the second speed gear, and
    the first output gear or the second output gear is configured to transmit torque of the output shaft to a differential through a final reduction gear.

11. The continuously variable transmission apparatus of claim 10, wherein the variable shift apparatus includes:
    a primary pulley connected to the main shaft and changing a diameter thereof;
    a secondary pulley connected to the subshaft and changing a diameter thereof; and
    a belt connecting the primary pulley with the secondary pulley.

12. The continuously variable transmission apparatus of claim 10, wherein the reverse speed gear is externally meshed with the second speed gear such that the torque of the main shaft is transmitted to the subshaft.

13. The continuously variable transmission apparatus of claim 10, wherein the reverse speed gear is externally meshed to the first speed gear such that the torque of the main shaft is transmitted to the subshaft.

14. The continuously variable transmission apparatus of claim 10, wherein the first output gear is externally meshed with the final reduction gear such that the torque of the output shaft is transmitted to the differential.

15. The continuously variable transmission apparatus of claim 10, wherein the second output gear is externally meshed with the final reduction gear such that the torque of the output shaft is transmitted to the differential.

* * * * *